United States Patent
Prestel et al.

(10) Patent No.: US 7,252,476 B2
(45) Date of Patent: Aug. 7, 2007

(54) DEVICE FOR LUBRICATING A COMPONENT IN A TURBOMACHINE

(75) Inventors: Sebastien Jean-Laurent Prestel, Arpajon (FR); Olivier Renon, Courpalay (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/241,912

(22) Filed: Oct. 4, 2005

(65) Prior Publication Data

US 2006/0088408 A1    Apr. 27, 2006

(30) Foreign Application Priority Data

Oct. 27, 2004    (FR) .................................. 04 11435

(51) Int. Cl.
*F01D 25/26* (2006.01)
(52) U.S. Cl. ...................... 415/111; 415/115; 415/176; 415/180
(58) Field of Classification Search ................ 415/176, 415/180
See application file for complete search history.

(56) References Cited

U.S. PATENT DOCUMENTS

| | | | |
|---|---|---|---|
| 3,874,676 A | | 4/1975 | Taylor et al. |
| 4,561,246 A | * | 12/1985 | Hovan ........................ 60/226.1 |
| 4,709,545 A | * | 12/1987 | Stevens et al. ............ 60/39.08 |

FOREIGN PATENT DOCUMENTS

| | | |
|---|---|---|
| DE | 19648641 A1 | 5/1998 |
| WO | WO 98/39609 | 9/1998 |

* cited by examiner

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

A device for lubricating a component in a turbomachine, in particular a shaft bearing in a turbojet, the device comprising an annular support part defining a lubrication chamber around the component, an annular cover mounted in sealed manner on the part and including a lubricating oil inlet, and an annular channel for passing a flow of pressurizing and cooling air, which channel is formed between the part and the cover, and communicates with ducts in the support part and an annular enclosure formed in the cover for passing the pressurizing and cooling air.

20 Claims, 2 Drawing Sheets

DEVICE FOR LUBRICATING A COMPONENT IN A TURBOMACHINE

The present invention relates to a device for lubricating a component in a turbomachine, in particular a shaft bearing in a turbojet.

BACKGROUND OF THE INVENTION

A turbomachine comprises a gas turbine having a plurality of fixed vane stages and a plurality of moving blade stages carried by a rotor mounted on a turbine shaft. The turbine shaft is centered and guided in rotation by bearings that need to be fed continuously with oil in order to limit friction wear thereof.

A known device for lubricating a turbomachine bearing comprises:

an annular bearing support part mounted on the stator of the turbomachine and defining a lubrication chamber around the bearing; and an annular cover having an inlet for oil for lubricating the bearing, the annular cover being mounted in sealed manner on a radial end face of the annular support part, sealing being provided by an annular gasket mounted between the support part and the cover, and said cover including an annular enclosure for a flow of pressurizing and cooling air, which enclosure is fed at its upstream end by ducts formed in the support part and opening out at their downstream ends in the radial end face of the support part around the annular gasket.

In operation of the turbomachine, the temperature of the pressurizing and cooling air flowing in the ducts of the support part and in the annular enclosure of the cover is about 200° C. This air serves essentially to pressurize the rear enclosure and also to cool the material situated close to said duct or to the annular enclosure of the cover, while portions that are further away from the support part and the cover, in particular the portions of the radial end face of the support part situated between the downstream ends of the above-mentioned ducts can reach temperatures as high as about 370° C.

The annular gasket situated close to the radial end face of the support part is thus locally exposed to high temperatures. This gasket is generally an elastomer gasket of the Viton® type with limited ability to withstand temperatures above 200° C. It is therefore not effective in sealing the lubrication chamber of the bearing, and, while the turbomachine is in operation, oil leaks can appear between the radial end face of the support part and the upstream end of the annular enclosure of the cover. These oil leaks increase the oil consumption of the lubrication device, and can also lead to coke being deposited on the components of the turbomachine situated close to the leak, which deposit can form hot points and reduce lifetime.

OBJECTS AND SUMMARY OF THE INVENTION

A particular object of the invention is to provide a solution to this problem that is simple, inexpensive, and effective.

The invention provides a device of the above-specified type for lubricating a component of a turbomachine, in which the annular gasket can be used without risk of the gasket deteriorating and without risk of oil leaking out from the lubrication chamber.

To this end, the invention provides a lubrication device for lubricating a component in a turbomachine, in particular a shaft bearing in a turbojet, the device comprising:

an annular component support part mounted on stationary elements and defining a lubrication chamber around the component; and an annular cover including an oil inlet for lubricating the component, the annular cover being mounted in sealed manner on a radial end face of said annular support part, sealing being provided by an annular gasket mounted between the support part and the cover, said cover including an annular enclosure for feeding pressurizing and cooling air, which enclosure is fed at its upstream end by ducts formed through the support part and having their downstream ends opening out around the above-mentioned annular gasket;

the device including an annular channel for providing a flow of pressurizing and cooling air, which channel is formed between the radial end face of the support part and the upstream end of said enclosure, and interconnecting the downstream ends of the ducts in the support part.

This annular air flow channel serves to bring pressurizing and cooling air onto the portions of the end radial face of the support part that are situated between the downstream ends of the above-mentioned duct, thereby cooling the gasket around its entire perimeter. The annular gasket is thus no longer locally exposed to temperatures well above 200° C., and can thus seal the lubrication chamber reliably.

The pressurizing and cooling air that flows inside the annular channel is at a pressure greater than that of the air and oil mixture inside the lubrication chamber and than that of the air outside the lubrication chamber, and it opposes leakage of air and oil from said chamber.

Advantageously, the annular channel opens out in the vicinity of the sealing gasket at the interface between the gasket mounting surfaces so as to cool the material adjacent to the annular gasket effectively. By way of example, this channel opens out at the interface between the gasket mounting surfaces via a chamfer in the peripheral edge of the radial face of the support part.

In an embodiment of the invention, the annular channel is formed in an upstream radial end face of the cover facing the downstream ends of the above-mentioned ducts in the support part, and includes orifices in alignment with said ducts and opening out into said enclosure. In this way, the annular channel cools the gasket over its entire circumference without impeding the passage of air in the above-mentioned ducts of the support part.

In another embodiment of the invention, the annular channel is formed by a chamfer in the peripheral edge of the radial end face of the support part, and extends radially from an axial annular gap formed between said radial end face and the upstream end of the enclosure in the vicinity of the downstream ends of the above-mentioned ducts of the support part, to the interface of the annular gasket mounting surfaces.

In this embodiment, the annular channel communicates with the enclosure of the cover via at least one hole through an upstream end wall of said enclosure, and a second sealing gasket is advantageously mounted in the above-mentioned axial annular gap and has orifices for passing pressurizing and cooing air, which orifices are in alignment with the ducts of the support part. This improves sealing of the lubrication chamber and avoids air and oil leaking out from said chamber, even in the event of the second sealing gasket deteriorating.

The invention also provides a turbojet having a turbine whose shaft is guided by a bearing fitted with a lubrication device including an annular channel of the above specified type.

BRIEF DESCRIPTION OF THE DRAWINGS

Other advantages and characteristics of the invention appear on reading the following detailed description made by way of non-limiting example and with reference to the accompanying drawings, in which.

MORE DETAILED DESCRIPTION

Figure 1:
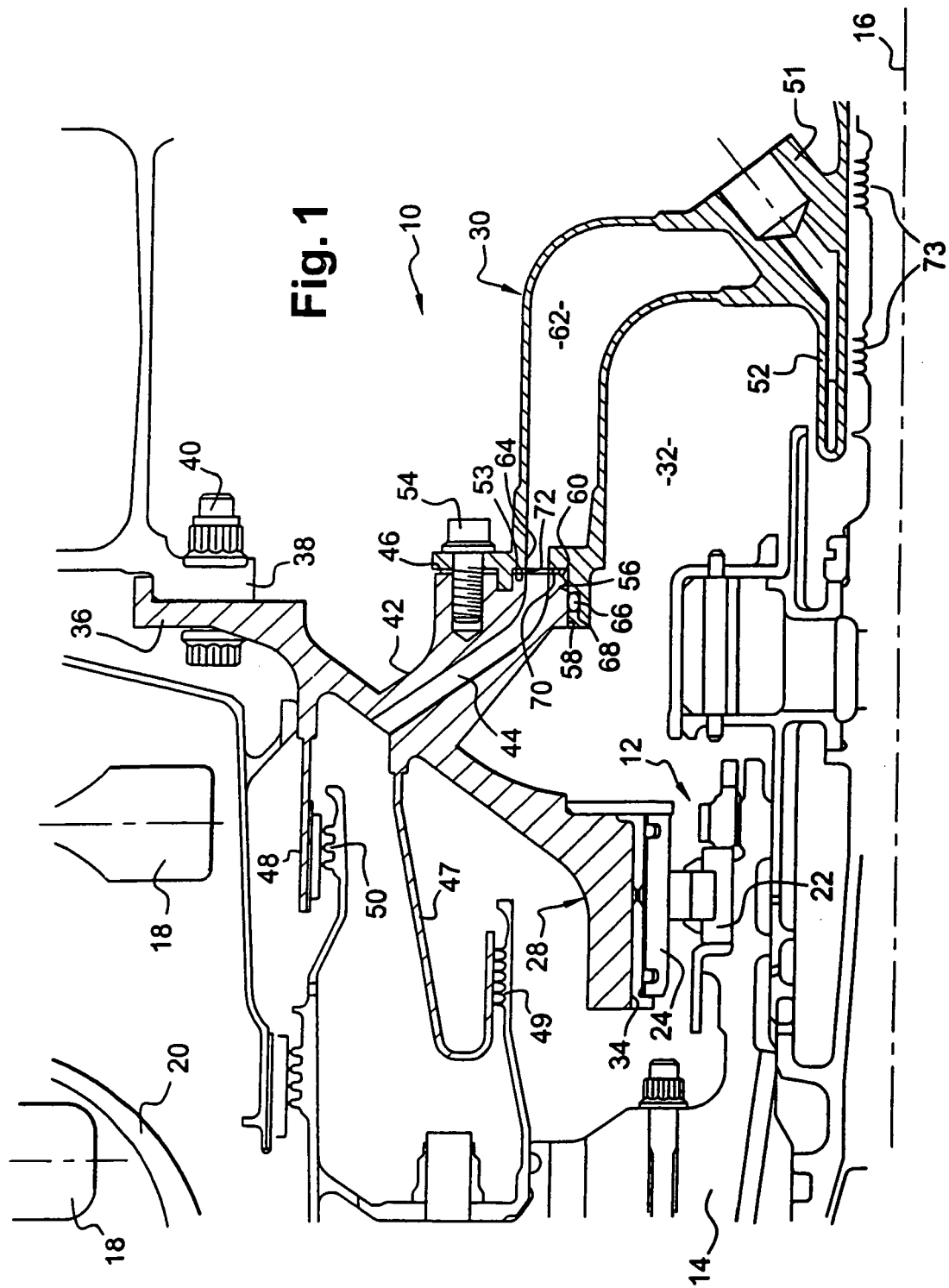
FIG. 1 is a diagrammatic half view in longitudinal section of a prior art device for lubricating a shaft bearing in a turbojet.

In the drawings, the left is upstream or towards the front while the right is downstream or towards the rear of the turbojet.

Reference is made initially to FIG. 1 which is a diagrammatic longitudinal half-view of a prior art device 10 for lubricating a bearing 12 of a low pressure turbine shaft 14 of a turbojet, shown in fragmentary section on a plane containing the axis 16 of rotation of the turbine.

The turbine rotor comprises turbine disks 18 shown in part that are connected to one another and that carry at their peripheries stages of moving blades (not shown), the disks 18 being separated from one another by stationary vane stages (not shown) and being connected to the turbine shaft 14 via a drive cone 20 that is shown in part.

In the example shown, the bearing 12 is a rolling bearing whose inner cap 22 is carried by the shaft 14 and whose outer cap 24 is carried by an annular part 28 provided with an annular cover 30 and defining an annular lubrication chamber 32 around the shaft bearing 12 and a corresponding portion of the shaft 14 and of its rear endpiece.

The annular part 28 is substantially frustoconical in shape and at its smaller-diameter, upstream end it includes a cylindrical passage 34 on the axis 16 in which the outer cap 24 of the bearing 12 is mounted, and at its larger-diameter, downstream end it has an annular flange 36 which is pressed against an annular flange 38 of a stationary element of the turbine and is fastened thereto by appropriate means, e.g. of the screw-and-nut type 40.

The middle portion of the annular part 28 comprises a frustoconical wall 42 that extends downstream and towards the axis 16 of rotation of the turbine, and in which there are formed air flow ducts 44 having upstream ends opening out in the upstream outside face of the annular part 28, and downstream ends opening out in a radial end face 46 of the wall 42.

The annular part 28 also has two substantially-cylindrical skirts 47 and 48 extending upstream, with the upstream ends of the ducts 44 opening out between the skirts. The upstream ends of the skirts 47 and 48 co-operate in sealing manner with respective labyrinth seals 49, 50 carried by elements of the turbine rotor.

The annular cover 30 is closed at its downstream end mounted in sealed manner around the turbine shaft 14 and has at least one tubular endpiece 51 for being fed with oil that is connected to a duct 52 opening out into the lubrication chamber 32 in the vicinity of the bearing 12. The upstream end of the annular cover 30 has an annular radial face 53 mounted in sealed manner against the radial end face 46 of the wall 42 and fastened thereto by screws 54, and an outwardly facing cylindrical bearing surface 56 co-operating with an inwardly facing cylindrical bearing surface 58 at the downstream end of the wall 42. A chamfer 60 is formed in the inner peripheral edge of the radial face 46 and surrounds the cylindrical bearing surface 56 at the upstream end of the cover.

The annular cover 30 has an annular enclosure 62 for passing pressurizing and cooling air, which enclosure extends from upstream to downstream, opening out at its downstream end at the periphery of the shaft 14, and communicating at its upstream end via a plurality of orifices 64 formed through the upstream end face 53 of the cover 30 with the downstream ends of the above-mentioned ducts 44 formed through the wall 42 of the part 28.

The lubrication chamber 32 is sealed at the junction between the part 28 and the cover 30 by an annular gasket 66 mounted between the cylindrical bearing surfaces 58 and 56 of the wall 42 and of the cover 30 respectively in an annular groove 68 formed in the cylindrical bearing surface 56 of the cover 30. Another annular gasket 70 may also be mounted between the radial end faces 53 and 46 of the cover 30 and of the part 28 respectively at the downstream ends of the ducts 44, this gasket 70 having air-passing orifices 72 in alignment with the ducts 44 of the wall 42 and the orifices 64 of the cover 30.

The lubrication chamber 32 at the downstream end of the cover is sealed by labyrinth seals 73 carried by the shaft 14 and situated on either side of the downstream end of the annular enclosure 62.

When the turbojet is in operation, the pressurizing and cooling air at a temperature of about 200° C. flows from upstream to downstream by passing between the skirts 47 and 48 and into the ducts 44 in the part 28 and then into the enclosure 62 of the cover 30. The pressure of the air in the ducts 44 in the part and in the enclosure 62 of the cover 30 is greater than the pressures inside the lubrication chamber 32 and outside the lubrication device 10, such that the air and oil mixture contained in the lubrication chamber 32 cannot escape through the labyrinth seals 49, 50, 73.

The feed of pressurizing and cooling air serves to reduce temperature considerably, for example to cause it to pass from about 350° C.-370° C. to about 200° C. in zones close to the air flow ducts 44 and in those portions of the gasket 66 (or the gasket 70) that are closest to these ducts 44. Nevertheless, those portions of these gaskets that are situated between the downstream ends of the ducts 44 are not cooled and therefore remain at high temperatures. The annular gasket 66 is thus subjected to considerable temperature differences around its circumference which leads to deterioration thereof and can also lead to oil leaking between the radial faces 46 and 53 of the part 28 and of the cover 30 respectively going towards the outside of the chamber 32.

The object of the present invention is to provide a lubrication device of the above-described type having an annular pressurizing and cooling air flow channel formed between the radial face 46 of the part 28 and the radial face 53 of the cover 30, so as to interconnect the downstream ends of the ducts 44 and cool the annular gasket 66 around its entire perimeter.

Figure 2:
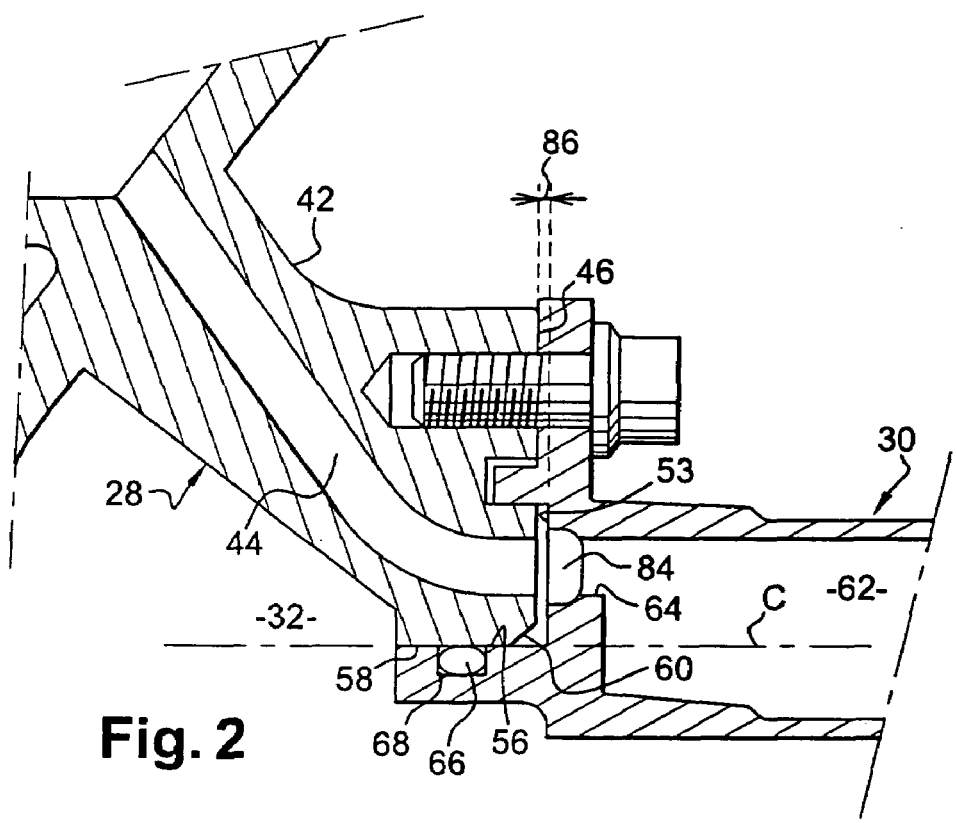
FIG. 2 is a fragmentary diagrammatic longitudinal section view on a larger scale of a lubrication device of the invention, showing the zone sealed by the annular gasket.

In the embodiment shown in part in FIG. 2, the annular channel 84 is hollowed out in the upstream radial end face 53 of the cover 30 level with the orifices 64 of the enclosure 62 and facing the downstream ends of the ducts 44 in the part 28.

An axial annular gap 86 is advantageously left between the downstream radial end face 46 of the part 28 and the upstream radial end face 53 of the cover 30, and extends radially inwards from the downstream ends of the ducts 44 so that the annular channel 84 can open in the contact surface C between the inner and outer cylindrical bearing surfaces 58 and 56 of the part 28 and the cover 30 respectively, via the above-mentioned chamfer 60 in the peripheral edge of the downstream radial end face 46. of the part 28.

Figure 3:
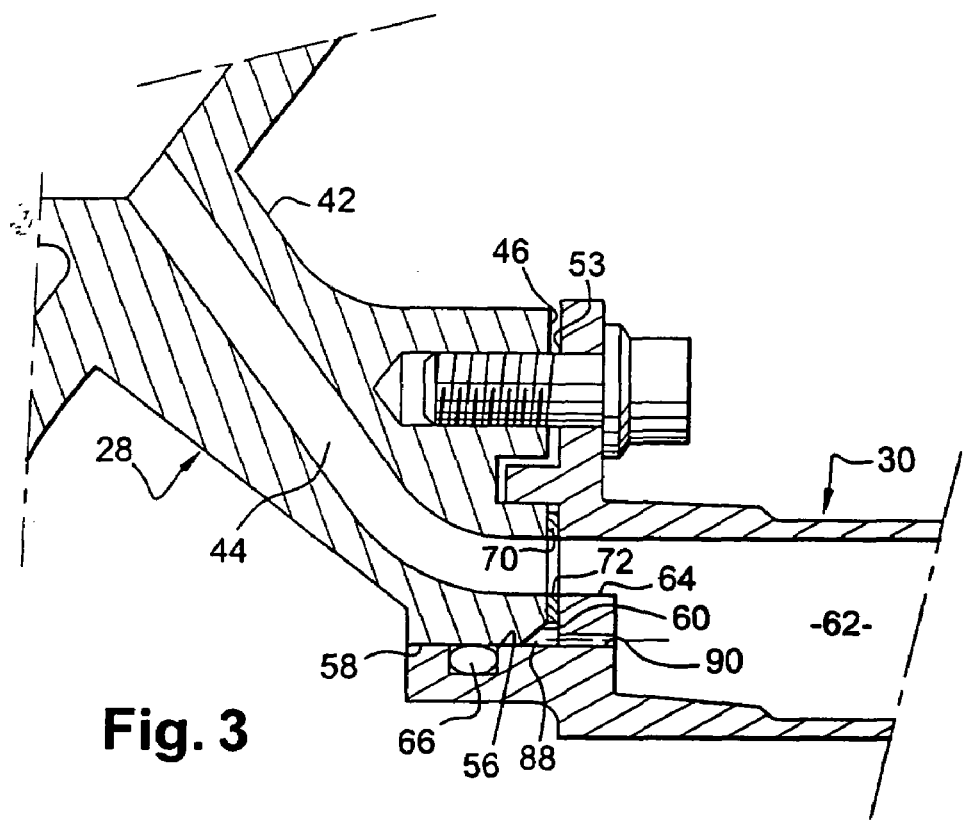
FIG. 3 is a fragmentary diagrammatic longitudinal section view of a variant of the lubrication device of the invention.

In the variant embodiment shown in part in FIG. 3, the annular channel 88 is formed by the annular chamfer 60 in the peripheral edge of the radial face 46 of the part 28 and it can be fed with pressurizing and cooling air via the above-mentioned axial gap 86 or via one or more holes 90 formed through the upstream radial end face 53 of the cover 30 and opening out into the enclosure 62. Under such circumstances, an above-mentioned sealing gasket 70 can be mounted between the upstream and downstream radial end faces 53 and 46 of the cover 30 and of the part 28 respectively at the downstream ends of the ducts 44, the orifices 72 in the gasket 70 being in alignment with the ducts 44 and the orifices 64 for passing the cooling air.

By cooling the gasket 66 over its entire perimeter, it is possible to use a gasket made of Viton® or the like in a temperature range that does not exceed about 200° C., in which range the gasket remains fully effective and has a long lifetime.

The present invention also provides a turbojet including a turbine whose shaft is guided by a bearing fitted with a lubrication device having an annular channel of the above-specified type.

What is claimed is:

1. A lubrication device for lubricating a shaft bearing in a turbojet, the device comprising:
an annular component support part mounted on stationary elements and defining a lubrication chamber around the shaft bearing; and
an annular cover including an oil inlet for lubricating the shaft bearing, the annular cover having a radial end face mounted in a sealed manner on a radial end face of said annular support part, sealing being provided by an annular gasket mounted between the support part and the cover, said cover including an annular enclosure for feeding pressurizing and cooling air, the enclosure is fed at its upstream end by ducts formed through the support part and having their downstream ends opening out around the annular gasket, wherein
the device includes means for providing a flow of pressurizing and cooling air between the radial end face of the support part and the radial end face of said cover around said annular gasket.

2. A lubrication device according to claim 1, wherein the annular gasket is mounted between cylindrical bearing surfaces of the support part and of the cover, and
the means for providing a flow of pressurized and cooling air opens out in a vicinity of the annular gasket at an interface between said cylindrical bearing surfaces.

3. A lubrication device according to claim 1, wherein the means for providing a flow of pressurized and cooling air comprises an annular channel formed in the radial end face of the cover facing the downstream ends of the ducts in the support part, and includes orifices in alignment with said ducts and opening out into said enclosure.

4. A lubrication device according to claim 3, wherein said annular channel opens out to an interface between cylindrical bearing surfaces of the support part and of the cover via a chamfer in a peripheral edge of the radial end face of the support part.

5. A lubrication device according to claim 1, wherein an axially-extending annular gap is formed between the radial end face of the support part and the radial end face of the cover level with the downstream ends of the ducts in the support part.

6. A lubrication device according to claim 5, wherein an annular channel is formed by a chamfer in a peripheral edge of the radial end face of the support part, said chamfer interconnecting the axially-extending gap and an interface of cylindrical bearing surfaces of the support part and of the cover.

7. A lubrication device according to claim 6, wherein the annular channel communicates with the enclosure of the cover via at least one hole in the radial end face of the cover.

8. A lubrication device according to claim 5, wherein another sealing gasket is mounted in the axially-extending annular gap and includes orifices for passing pressurizing and cooling air, the orifices are in alignment with the ducts in the support part.

9. A turbojet, comprising:
a turbine whose shaft is guided by a bearing fitted with lubrication means,
wherein the lubrication means include a lubrication device according to claim 1.

10. A lubrication device, comprising:
an annular component support part having a radial end face and defining a lubrication chamber around a component;
an annular cover having a radial end face disposed to the radial end face of the annular support part, the annular cover including
an inlet configured to lubricate the component, and
an annular enclosure configured to feed air;
an annular gasket configured to seal the annular component support part and the annular cover; and
an annular channel configured to provide a flow of the air around the annular gasket.

11. A lubrication device according to claim 10, wherein
the annular gasket is mounted between cylindrical bearing surfaces of the annular component support part and of the annular cover, and
the annular channel opens out in a vicinity of the annular gasket at an interface between the cylindrical bearing surfaces.

12. A lubrication device according to claim 10, wherein
the annular component support part includes ducts, and
the annular channel is formed in the radial end face of the annular cover facing downstream ends of the ducts, and includes orifices in alignment with the ducts and opening into the annular enclosure.

13. A lubrication device according to claim 12, wherein the annular channel opens out to an interface between cylindrical bearing surfaces of the annular component support part and of the annular cover via a chamfer in a peripheral edge of the radial end face of the annular component support part.

14. A lubrication device according to claim 10, wherein
the annular component support part includes ducts, and
an axially-extending annular gap is formed between the radial end face of the annular component support part and the radial end face of the annular cover level with downstream ends of the ducts.

15. A lubrication device according to claim 14, wherein the annular channel is formed by a chamfer in a peripheral edge of the radial end face of the annular component support part, the chamfer interconnecting the axially-extending gap and an interface of cylindrical bearing surfaces of the annular component support part and of the annular cover.

16. A lubrication device according to claim 15, wherein the annular channel communicates with the enclosure via at least one hole in the radial end face of the annular cover.

17. A lubrication device according to claim 14, wherein another sealing gasket is mounted in the axially-extending annular gap and includes orifices to pass the air, the orifices are in alignment with the ducts.

18. A lubrication device according to claim 10, wherein the air is at a higher pressure than the pressure inside the lubrication chamber.

19. A lubrication device according to claim 10, wherein the air is at a higher pressure than the pressure outside the lubrication device.

20. A turbojet, comprising:
a turbine whose shaft is guided by a bearing fitted with a lubrication device according to claim 10.

* * * * *